(12) United States Patent
Hsieh et al.

(10) Patent No.: US 9,554,152 B2
(45) Date of Patent: Jan. 24, 2017

(54) CONCURRENT PROCESSING OF HORIZONTAL AND VERTICAL TRANSFORMS

(71) Applicant: Qualcomm Incorporated, San Diego, CA (US)

(72) Inventors: Cheng-Teh Hsieh, San Diego, CA (US); Feng Ge, San Diego, CA (US); Sumit Mohan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 326 days.

(21) Appl. No.: 13/940,474

(22) Filed: Jul. 12, 2013

(65) Prior Publication Data

US 2015/0016536 A1    Jan. 15, 2015

(51) Int. Cl.
*H04N 19/122* (2014.01)
*H04N 19/124* (2014.01)
*H04N 19/593* (2014.01)
*H04N 19/61* (2014.01)
*H04N 19/436* (2014.01)
*H04N 19/137* (2014.01)
*H04N 19/577* (2014.01)
*H04N 19/625* (2014.01)

(52) U.S. Cl.
CPC .......... *H04N 19/593* (2014.11); *H04N 19/122* (2014.11); *H04N 19/124* (2014.11); *H04N 19/137* (2014.11); *H04N 19/436* (2014.11); *H04N 19/577* (2014.11); *H04N 19/61* (2014.11); *H04N 19/625* (2014.11)

(58) Field of Classification Search
CPC .. H04N 19/122; H04N 19/124; H04N 19/137; H04N 19/436; H04N 19/577; H04N 19/61; H04N 19/625
See application file for complete search history.

(56) References Cited

U.S. PATENT DOCUMENTS

| 6,112,219 A | 8/2000 | Girod et al. |
| 2006/0195872 A1* | 8/2006 | Seo ........................ H04H 60/80 725/87 |
| 2009/0080515 A1 | 3/2009 | Nagaraj et al. |
| 2012/0082231 A1 | 4/2012 | Rojals et al. |
| 2012/0127003 A1* | 5/2012 | Shibahara ............ H04N 19/122 341/87 |

(Continued)

FOREIGN PATENT DOCUMENTS

WO    0109717 A1    2/2001

OTHER PUBLICATIONS

Slawecki et al., "DCT/IDCT Processor Design for High Data Rate Image Coding," IEEE Transactions on Circuits and Systems for Video Technology, vol. 2, No. 2, Jun. 1992, pp. 135-146.*

(Continued)

*Primary Examiner* — Thai Tran
*Assistant Examiner* — Christopher T Braniff
(74) *Attorney, Agent, or Firm* — Shumaker & Sieffert, P.A.

(57) ABSTRACT

In an example, a method of transforming video data in video coding includes applying a first stage of a two-dimensional transform to a block of video data values to generate a block of first stage results, and applying a second stage of the two-dimensional transform to the block of first stage results without reordering the first stage results to generate a block of second stage results.

24 Claims, 9 Drawing Sheets

(56) References Cited

U.S. PATENT DOCUMENTS

2012/0287989 A1* 11/2012 Budagavi et al. ....... 375/240.03
2013/0022128 A1 1/2013 Symes
2013/0051475 A1 2/2013 Joshi et al.

OTHER PUBLICATIONS

Hsia et al., "Transposed-Memory Free Implementation for Cost-Effective 2D-DCT Processor," J. Sign. Process. Syst. (2010) 58:161-172.*
International Preliminary Report on Patentability from corresponding PCT Application Serial No. PCT/US2014/045122 dated Sep. 24, 2015 (31 pages).
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Hsia, et al., "Transposed-Memory Free Implementation for Cost-Effective 2D-DCT Processor", Journal of Signal Processing Systems for Signal, Image and Video Technology, Boston, XP019775321, vol. 58, No. 2, Mar. 14, 2009, pp. 161-172.
Taylor, et al.,"Design for the Discrete Cosine Transform in VLSI", IEEE Proceedings: Computers and Digital Techniques, vol. 145, No. 2, XP006010832, Mar. 23, 1998, pp. 127-133.
International Search Report and Written Opinion from International Application No. PCT/US2014/045122, dated Sep. 19, 2014, 12 pp.
Response to Written Opinion dated Sep. 19, 2014, from International Application No. PCT/US2014/045122, filed on Feb. 3, 2015, 48 pp.
Second Written Opinion from International Application No. PCT/US2014/045122, mailed May 26, 2015, 5 pp.

* cited by examiner

CONCURRENT PROCESSING OF HORIZONTAL AND VERTICAL TRANSFORMS

TECHNICAL FIELD

This disclosure relates to video coding, and more particularly to techniques for performing transformation when coding video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video picture or slice may be partitioned into blocks. Each block can be further partitioned. Blocks in an intra-coded (I) picture or slice are encoded using spatial prediction with respect to reference samples in neighboring blocks in the same picture or slice. Blocks in an inter-coded (P or B) picture or slice may use spatial prediction with respect to reference samples in neighboring blocks in the same picture or slice or temporal prediction with respect to reference samples in other reference pictures. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

Techniques of this disclosure generally relate to transformation of video data in a video coding process. A video coder may apply a two-dimensional (2-D) transform to video data in two stages. A buffer is typically positioned between the first stage and second stage, which allows the video coder to reorder processed data from the first stage prior to execution of the second stage. According to aspects of this disclosure the video coder may apply a 2-D transform without reordering data between the first stage and the second stage. In this way, the techniques of this disclosure may reduce or eliminate delays associated with transformation of video data.

In an example, a method of transforming video data in video coding includes applying a first stage of a two-dimensional transform to a block of video data values to generate a block of first stage results, and applying a second stage of the two-dimensional transform to the block of first stage results without reordering the first stage results to generate a block of second stage results.

In another example, an apparatus for transforming video data in video coding includes one or more processors configured to apply a first stage of a two-dimensional transform to a block of video data values to generate a block of first stage results, and apply a second stage of the two-dimensional transform to the block of first stage results without reordering the first stage results to generate a block of second stage results.

In another example, an apparatus for transforming video data in video coding includes means for applying a first stage of a two-dimensional transform to a block of video data values to generate a block of first stage results, and means for applying a second stage of the two-dimensional transform to the block of first stage results without reordering the first stage results to generate a block of second stage results.

In another example, a non-transitory computer-readable medium having instructions stored thereon that, when executed, cause one or more processors to apply a first stage of a two-dimensional transform to a block of video data values to generate a block of first stage results, and apply a second stage of the two-dimensional transform to the block of first stage results without reordering the first stage results to generate a block of second stage results.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
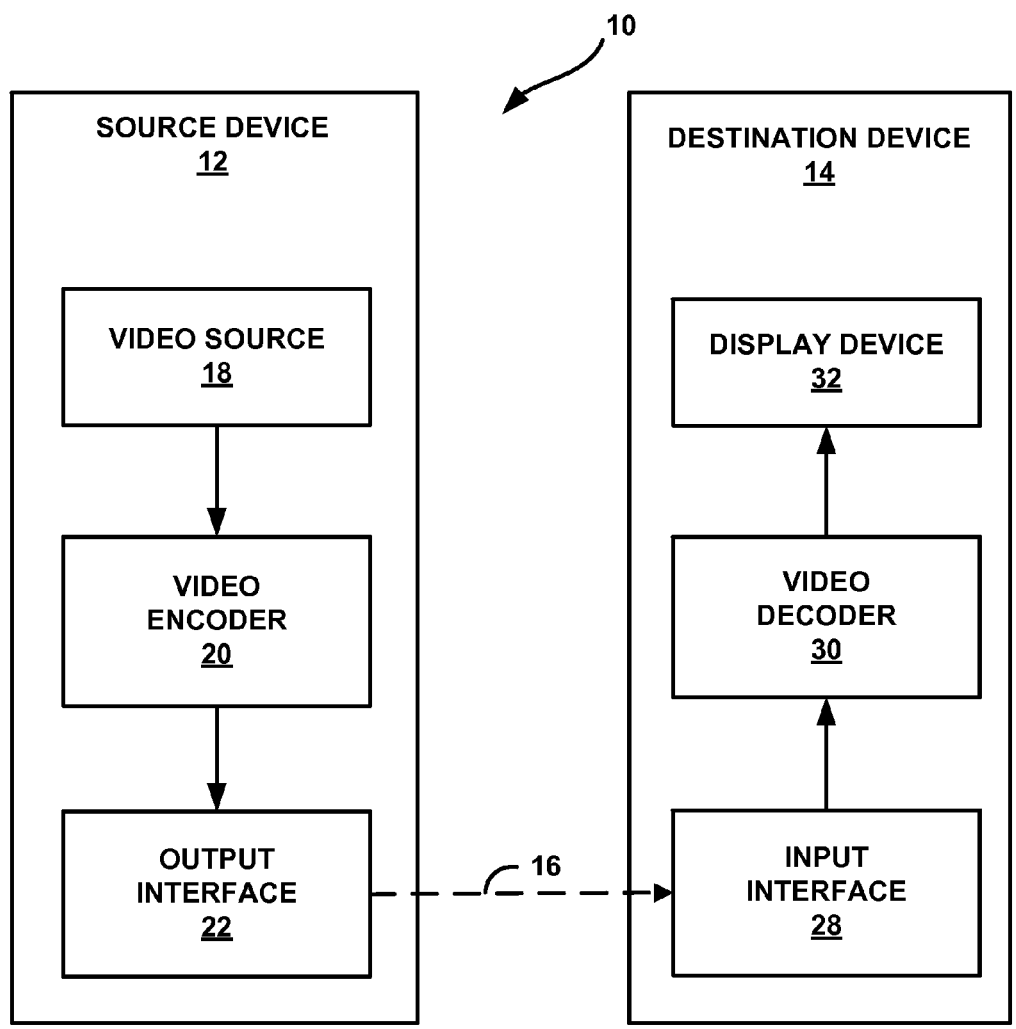
FIG. 1 is a block diagram illustrating an example video encoding and decoding system that may implement the techniques of this disclosure.

A video coding device (e.g., a video encoding device or a video decoding device) may achieve video compression by applying spatial (intra-frame) prediction and/or temporal (inter-frame) prediction techniques to reduce or remove redundancy inherent in video sequences. For example, the video coder may derive a predictor either through intra (I) prediction (i.e. spatial prediction) or inter (P or B) prediction (i.e. temporal prediction). Upon identification of a predictor, the video coder may determine the difference between the original video data block and its predictor. This difference may be referred to as the prediction residual, and indicates pixel differences between the block to be coded and the reference block, i.e., the predictor.

To achieve better compression, the prediction residual is generally transformed by applying a transform (a discrete cosine transform (DCT), integer transform, Karhunen-Loeve (K-L) transform, or other transform). The transform converts pixel difference values in the spatial domain to transform coefficients in the transform domain, e.g., a frequency domain.

Prediction residual typically includes luma samples (Y) together with corresponding chroma samples (Cb, Cr) for video data that has three sample arrays. As described in greater detail below, a transform unit may refer to a luma transform block and the two corresponding chroma transform blocks. The transform coefficients are normally arranged in a two-dimensional (2-D) array for each transform block in the transform unit. Accordingly, a video coder typically applies a 2-D transform to the prediction residual.

The video coder typically applies a 2-D transform in two stages. For example, the video coder may apply a horizontally oriented first stage to residual values. The video coder may then apply a vertically oriented second stage to the result of the first stage (or vice versa). A buffer is typically positioned between the first stage and second stage, which allows the video coder to reorder the data from the first stage prior to execution of the second stage. For example, when performing a horizontally oriented first stage prior to a vertically oriented second stage, the video coder may transpose the data between stages (from row order to column order), so that the data is suitably arranged for second stage operations. That is, the video coder may transpose the data so that the rows of data are arranged in columns prior to second stage operations.

The buffering described above may introduce delay in the transformation process. For example, to transpose the values from the first stage in the manner described above, the video coder must wait for the entire first stage to be completed before beginning second stage operations. The transposing process itself may also introduce delay. These delays may increase with block size. For example, transforming a relatively large block (e.g., a 32×32 in the High Efficiency Video Coding (HEVC) standard) may result in large associated delays.

Aspects of this disclosure generally relate to efficient application of 2-D transforms. For example, according to aspects of this disclosure a video coder (e.g., a video encoder or video decoder) may apply a 2-D transform without reordering data between the first stage and the second stage, as described above. Reordering data may generally refer to changing the arrangement of data, which may include transposing data such that rows of data are rearranged to form columns of data. Accordingly, the video coder may perform operations associated with the first stage concurrently with operations associated with the second stage. In this way, the video coder may reduce or eliminate delays associated with transformation.

In one example, the video coder may directly feed values from a first stage of a 2-D transform to a second stage of the 2-D transform in an order determined by the second stage (referred to below as a "transpose first" process). In another example, the video coder may perform second stage operations in the order of the first stage, thereby generating partial second stage values. The video coder may aggregate the partial second stage values until the entire second stage is complete (referred to below as a "transpose later" process).

FIG. 1 is a block diagram illustrating an example video encoding and decoding system 10 that may utilize techniques for performing transformation in video coding. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for performing transformation in video coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for performing transformation may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone, smartphone, tablet computer, or the like.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 may operate according to a video compression standard, such as the ITU-T H.264 standard, alternatively referred to as MPEG-4, Part 10, Advanced Video Coding (AVC), or extensions of such standards. The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. Other examples of video compression standards include MPEG-2 and ITU-T H.263.

The JCT-VC has recently finalized the High Efficiency Video Coding (HEVC) standard. While the techniques of this disclosure are not limited to any particular coding standard, the techniques may be relevant to the HEVC standard. In HEVC, a video picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs.

In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU.

TUs may include coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

The transform coefficients are normally arranged in a 2-D array for each transform block (e.g., Y block, Cr block, Cb block, although other colorspaces are also possible) of a TU. Accordingly, video encoder 20 typically applies a 2-D transform for each transform block when transforming prediction residual. Video encoder 20 may apply the 2-D transform in two stages. For example, video encoder 20 may apply a horizontally oriented first stage to prediction residual, followed by a vertically oriented second stage to the result of the first stage (or vice versa).

In the example above, video encoder 20 may reorder results from the first stage of a transform prior to performing the second stage of the transform. For example, video encoder 20 may transpose the results of the first stage, allowing video encoder 20 perform the second stage with the appropriate orientation. Video encoder 20 may use a buffer to transpose the results of the first stage prior to performing the second stage.

In some instances, the reordering process described above may introduce delay in the transformation process. For example, to transpose the values from the first stage in the manner described above, video encoder 20 may wait until the entire first stage is complete. The transposing process itself may also introduce delay. These delays may increase with block size. For example, transforming relatively large blocks may result in relatively large associated delays. In an example for purposes of illustration, 1024 processing cycles may be needed to transpose a 32×32 block of transform coefficients of a TU.

According to aspects of this disclosure, video encoder 20 may apply a first stage of a 2-D transform to a block of residual video data values to generate a block of first stage results. Video encoder 20 may also apply a second stage of the 2-D transform to the block of first stage results without reordering the first stage results to generate a block of transform coefficients.

When transforming residual values, video encoder 20 may typically buffer one row (or column) of residual values at a time, e.g., the row (or column) that is being transformed by the first stage. According to aspects of this disclosure, in an example, video encoder 20 may buffer all residual data associated with the block being transformed prior to performing the transformation. In this example, video encoder 20 may process the first stage in the order required by the second stage, as described in greater detail below, which may allow video encoder 20 to directly feed data from the first stage to the second stage in the order required by the second stage without reordering the data prior to the second stage operations.

In another example, rather than buffering all residual data and altering the manner in which the first stage operations are performed, according to aspects of this disclosure, video encoder 20 may alter the manner in which second stage results are handled. For example, video encoder 20 may perform first stage operations in a conventional manner, e.g., row by row or column by column. Rather than waiting until first stage operations are complete (and reordering the first stage results), video encoder 20 may feed the first stage results directly into the second stage as they are produced and without reordering the first stage results to generate partial second stage results. That is, video encoder 20 may generate partial second stage results for each first stage result. Video encoder 20 may then aggregate the partial results for each transform coefficient to produce a final second stage results.

Following transformation, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

The video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan.

After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, picture-based syntax data, and group of pictures (GOP)-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video decoder 30, upon receiving the coded video data, may perform a decoding pass generally reciprocal to the encoding pass described with respect to video encoder 20. According to aspects of this disclosure, for example, video decoder 30 may perform transformation in a similar manner as described above with respect to video encoder 20. For example, while the transformation process described above is described with respect to forward transformation (e.g., transformation of residual values to the transform domain), it should be understood that similar techniques are applicable to inverse transforms (e.g., transformation of transform coefficients to residual values). Accordingly, video decoder 30 may perform the transformation techniques of this disclosure to inverse transform parsed transform coefficients from an encoded bitstream to residual values.

In this way, video encoder 20 and/or video decoder 30 may perform the techniques of this disclosure to efficiently transform video data in a video coding process. For example, performing second stage operations of a transform without reordering values may allow video encoder 20 and/or video decoder 30 to perform first stage operations and second stage operations concurrently.

In an example for purposes of illustration, video encoder 20 and/or video decoder 30 may process a first row (or column) with a first stage of a transform to generate a first result. Without waiting for additional first stage operations to be performed, video encoder 20 and/or video decoder 30 may apply a second stage of the transform to the first stage result. In addition, video encoder 20 and/or video decoder 30 may concurrently process a second row (or column) with the first stage of the transform to generate a second result. In addition, video encoder 20 and video decoder 30 may increase efficiency by eliminating the time associated with reordering values between a first stage and a second stage of a transform.

In some instances, there may be tradeoffs between the approaches described above. For example, the process of filling a buffer with an entire block of values (e.g., residual values or coefficient values) and performing a first stage of a transform in the order of a second stage of the transform may be suited to video coders (such as video encoder 20 or video decoder 30) having a relatively large amount of available memory bandwidth, which may be shared with one or more other components of the video coder. In contrast, the process of generating and aggregating partial second stage results may be suited to video coders having a relatively fixed amount of memory bandwidth. Accordingly, the techniques of this disclosure may be applicable to a variety of video coders having a variety of configurations.

Figure 2:
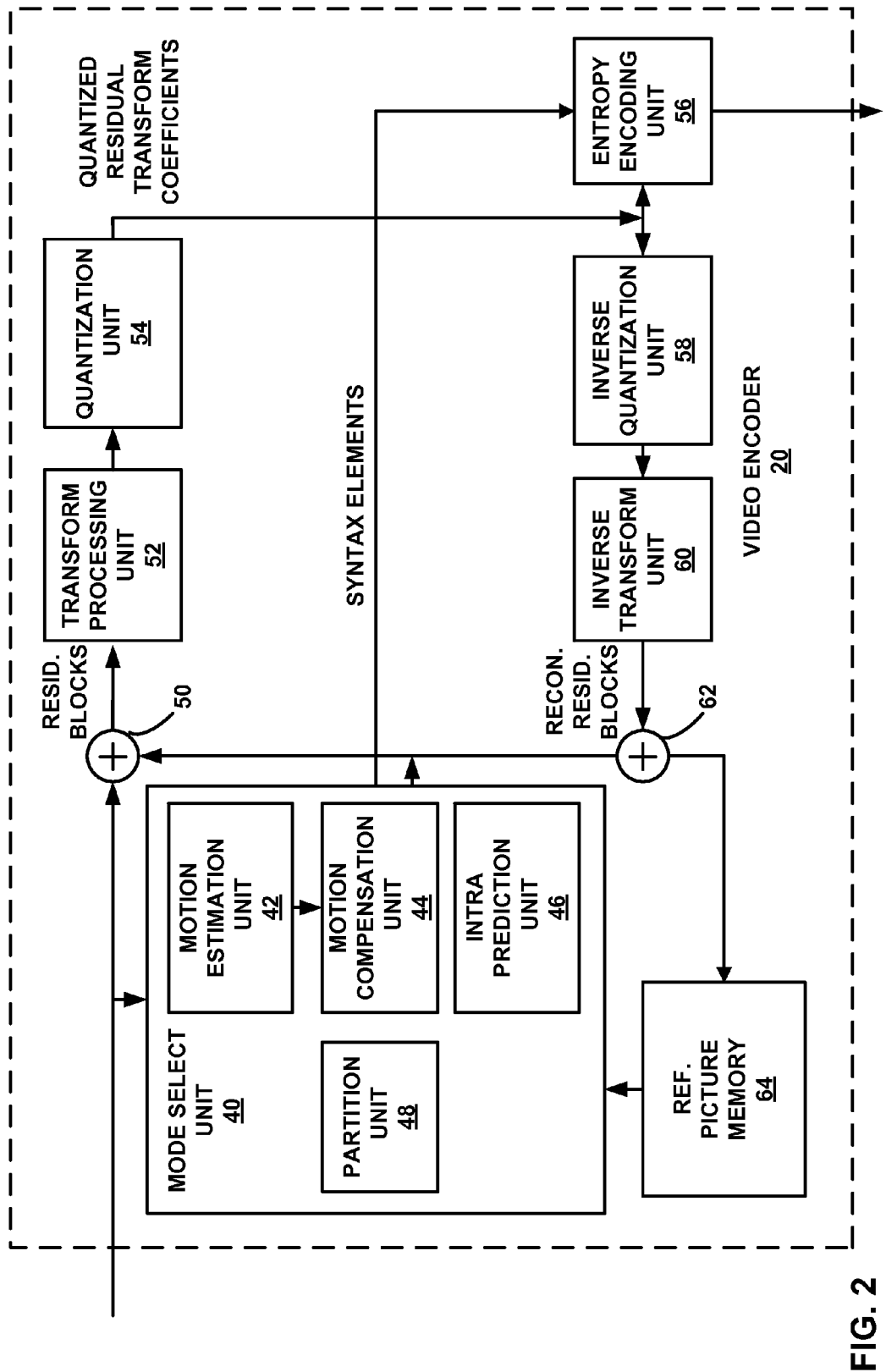
FIG. 2 is a block diagram illustrating an example video encoder that may implement the techniques of this disclosure.

FIG. 2 is a block diagram illustrating an example of a video encoder 20 that may use techniques for transformation as described in this disclosure. The video encoder 20 will be described in the context of HEVC coding for purposes of illustration, but without limitation of this disclosure as to other coding standards or methods that may require scanning of transform coefficients.

Video encoder 20 may perform intra- and inter-coding of video blocks within video slices. Intra-coding relies on spatial prediction to reduce or remove spatial redundancy in video within a given video picture. Inter-coding relies on temporal prediction to reduce or remove temporal redundancy in video within adjacent pictures of a video sequence. Intra-mode (I mode) may refer to any of several spatial based compression modes. Inter-modes, such as uni-directional prediction (P mode) or bi-prediction (B mode), may refer to any of several temporal-based compression modes.

As shown in FIG. 2, video encoder 20 receives a current video block within a video picture to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video picture or slice to be coded. The picture or slice may be divided into multiple video blocks. Motion estimation unit 42 and motion compensation unit 44 perform inter-predictive coding of the received video block relative to one or more blocks in one or more reference pictures to provide temporal compression. Intra-prediction unit 46 may alternatively perform intra-predictive coding of the received video block relative to one or more neighboring blocks in the same picture or slice as the block to be coded to provide spatial compression. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a picture or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video picture relative to a predictive block within a reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

According to aspects of this disclosure, transform processing unit 52 may buffer all residual data associated with the block being transformed prior to performing the transformation. In this example, transform processing unit 52 may process the first stage in the order required by the second stage. Accordingly, transform processing unit 52 may directly feed data from the first stage to the second stage in the order required by the second stage without reordering the data prior to executing the second stage. Transform processing unit 52 may perform at least some first stage operations concurrently with second stage operations. For example, transform processing unit 52 may begin second stage operations as soon as the first row (or column, depending on the configuration of the 2-D transform) is complete.

The process of buffering all residual data prior to executing a first stage of a transform may be referred to herein as a "transpose first" process, because the ordering of data necessary for the second stage of the transform is available prior to first stage operations. It should be noted, however, in the transpose first process values are not actually "transposed" or reordered. Rather, as noted above, "transpose first" generally refers to the order in which the first stage operations are performed, which eliminates the need to transpose the values between the first and second stages.

In an example for purposes of illustration, assume that a 2-D transform is applied to a block of residual data, and that a first stage of the transform is row oriented, while a second stage of the transform is column oriented. In this example, as described in greater detail with respect to FIG. 5 below, transform processing unit 52 may apply the first stage of the transform in column order, thereby producing a column of first stage results. Accordingly, transform processing unit 52 may then apply the second stage of the transform to the results of the first stage.

In another example, according to aspects of this disclosure, transform processing unit 52 may perform first stage operations according to the orientation of the first stage, e.g., row by row or column by column. Transform processing unit 52 may then, without reordering the results from the first stage, generate partial second stage results for each first stage result. Transform processing unit 52 may then aggregate the partial results for each transform coefficient to produce a final second stage results.

The process of generating partial second stage results and aggregating those results, may be referred to herein as a "transpose later" process, because the data of the second stage is not available until the second stage operations are complete. Again, however, it should be noted that values are not "transposed" or reordered prior to the first stage or second stage operations. Rather, as noted above, "transpose later" generally refers to the order in which the first stage operations are performed, which eliminates the need to transpose the values between the first and second stages.

In an example for purposes of illustration, assume that a 2-D transform is applied to a block of residual data, and that a first stage of the transform is row oriented, while a second stage of the transform is column oriented. In this example, as described in greater detail with respect to FIG. 7 below, transform processing unit 52 may apply the first stage of the transform in row order, thereby producing a row of first stage results. Transform processing unit 52 may apply the second stage of the transform to each of the first stage results as the results become available, thereby generating a plurality of second stage results. Upon completing the second stage of the transform, transform processing unit 52 may aggregate the partial results for each transform coefficient.

In any case, transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. According to aspects of this disclosure, inverse transform unit 60 may apply an inverse of the process described above with respect to transform processing unit 52 to generate residual values from transform coefficients. For example, inverse transform unit 60 may apply a 2-D inverse transform to a block of transform coefficients using the "transpose first" or "transpose later" transformation process described above with respect to transform processing unit 52.

Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video picture.

In this manner, video encoder 20 represents an example of a video encoder that may apply a first stage of a two-dimensional transform to a block of residual video data values to generate a block of first stage results, and apply a second stage of the two-dimensional transform to the block of first stage results without reordering the first stage results to generate a block of transform coefficients.

Figure 3:
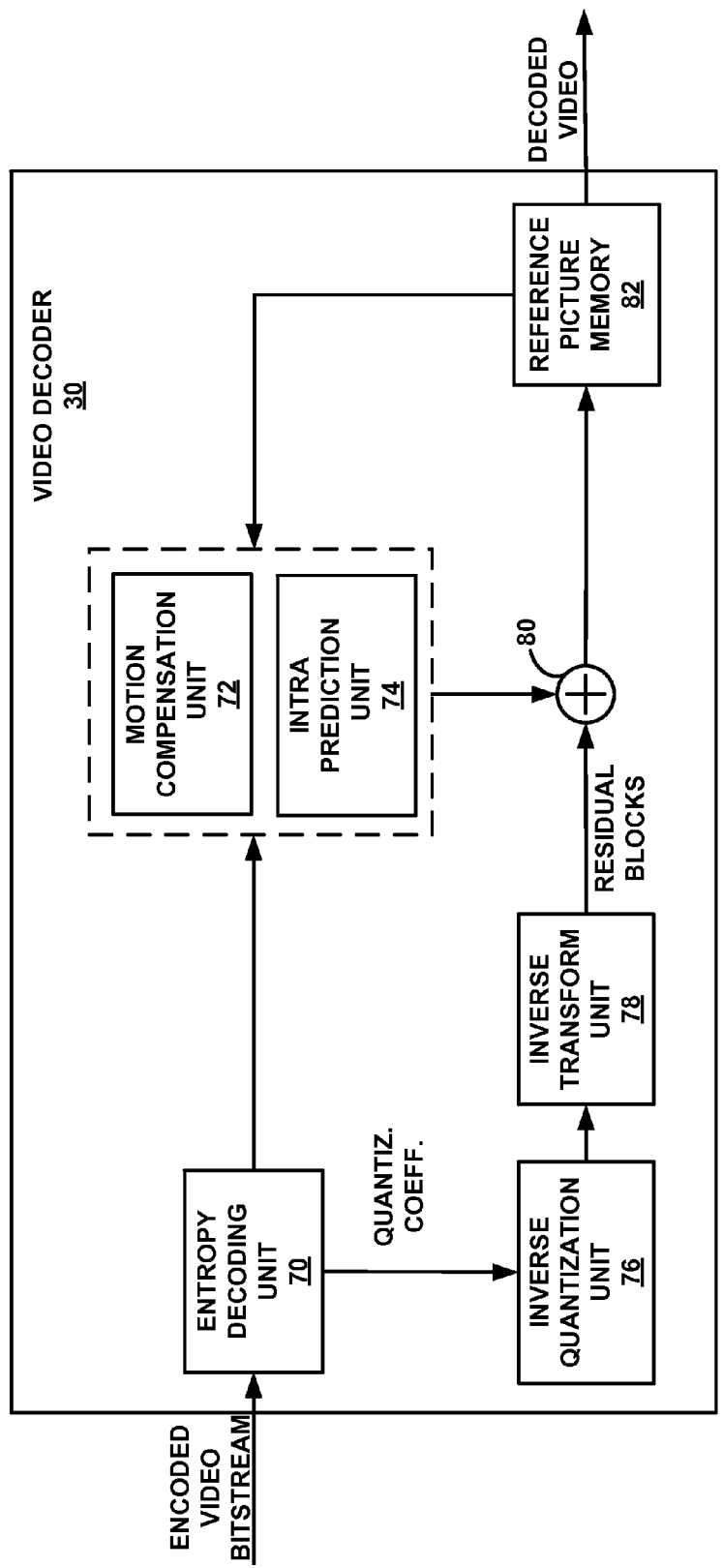
FIG. 3 is a block diagram illustrating an example video decoder that may implement the techniques of this disclosure.

FIG. 3 is a block diagram illustrating an example of video decoder 30 that may implement techniques for transformation as described in this disclosure. In the example of FIG. 3, video decoder 30 includes an entropy decoding unit 70, motion compensation unit 72, intra prediction unit 74, inverse quantization unit 76, inverse transformation unit 78, reference picture memory 82 and summer 80.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current picture. When the video picture is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain. The inverse transform may be reciprocal to the forward transform applied during video encoding (e.g., by video encoder 20). According to aspects of this disclosure, inverse transform unit 78 may perform transformation according to the "transpose first" or "transpose later" process described above with respect to video encoder 20.

For example, inverse transform unit 78 may buffer all data (e.g., inverse quantization results) associated with the block being transformed prior to performing the transformation. In this example, inverse transform unit 78 may process the first stage of the inverse transform in the order required by the second stage. Accordingly, inverse transform unit 78 may directly feed data from the first stage to the second stage in the order required by the second stage without reordering the data prior to executing the second stage. Inverse transform unit 78 may perform at least some first stage operations concurrently with second stage operations. For example, inverse transform unit 78 may begin second stage operations as soon as the first row (or column, depending on the configuration of the 2-D transform) is complete.

In another example, according to aspects of this disclosure, inverse transform unit 78 may perform first stage operations according to the orientation of the first stage. Inverse transform unit 78 may, without reordering the results from the first stage, generate partial second stage results for each first stage result. Inverse transform unit 78 may aggregate the partial results for each transform coefficient to produce a final second stage results. Again, Inverse transform unit 78 may perform at least some first stage operations concurrently with second stage operations. For example, inverse transform unit 78 may begin second stage operations as soon as the first value of the first stage has been evaluated.

In any case, after motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation.

If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 of FIG. 3 represents an example of a video decoder that may apply a first stage of a two-dimensional transform to a block of residual video data values to generate a block of first stage results, and apply a second stage of the two-dimensional transform to the block of first stage results without reordering the first stage results to generate a block of transform coefficients.

Figure 4:
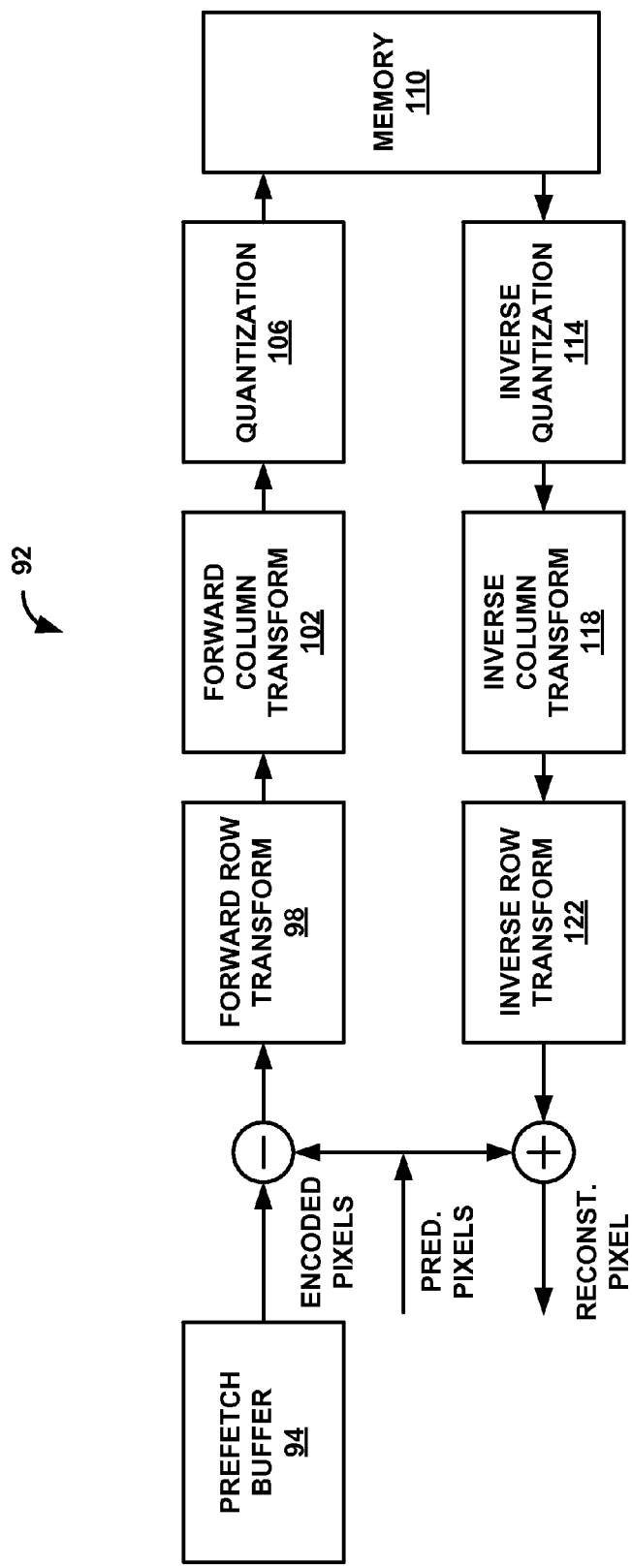
FIG. 4 is a block diagram illustrating a portion of an example video coder that may implement the techniques of this disclosure.

FIG. 4 is a block diagram illustrating a portion of an example video encoder 92 that may implement the techniques of this disclosure. In some examples, the portion of the video encoder 92 shown and described with respect to FIG. 4 may form a portion of video encoder 20 (FIGS. 1 and 2) and/or video decoder 30 (FIGS. 1 and 3) described above.

In any case, the example video encoder 92 of FIG. 4 may carry out the techniques of this disclosure referred to as the "transpose first" process described above. The portion of the video encoder 92 shown in FIG. 4 generally includes a prefetch buffer 94, a forward row transform unit 98, a forward column transform unit 102, a quantization unit 106, a memory 110, an inverse quantization unit 114, an inverse column transform unit 118, and an inverse row transform unit 122. It should be understood that one or more units of the video encoder 92 shown in FIG. 4 may be highly integrated, but are illustrated separately for conceptual purposes.

In some examples, prefetch buffer 94 may be memory associated with a transform engine that includes components of video encoder 92. In other examples, prefetch buffer 94 may be allocated in a memory of the video encoder 92 that is shared by a variety of components of video encoder 92. In any case, prefetch buffer 94 may be sized to store entire blocks of residual data of various sizes. In addition, in some instances, the bandwidth for accessing prefetch buffer 94 may be large enough to fill prefetch buffer 94 relatively quickly.

In some examples, forward row transform unit 98 and forward column transform unit 102 may be configured similarly to or the same as transform processing unit 52 shown in video encoder 20 of FIG. 2. Forward row transform unit 98 and forward column transform unit 102 may apply a forward row transform and a forward column transform of a 2-D transform, respectively, to a block of residual data. The forward row transform may be referred to as a first stage of a transform, and the forward column transform may be referred to as a second stage of the transform. The arrangement of forward row transform unit 98 and forward column transform unit 102 shown in FIG. 4 is for purposes of example only, and in other examples forward row transform unit 98 and forward column transform unit 102 may be transposed or a transform with a different orientation may be used.

Quantization unit 106 may quantize transform coefficients from forward row transform unit 98 and forward column transform unit 102. In some instances, quantization unit 106 may be configured similarly to or the same as quantization unit 54 shown in FIG. 2. Memory 110 may store quantized transform coefficients, and may be shared with one or more other components of the video encoder 92.

Inverse quantization unit 114 may perform inverse quantization in a reciprocal manner to quantization unit 106. Likewise, inverse column transform unit 118 and inverse row transform unit 122 may apply transformation in a reciprocal manner to forward column transform unit 102 and forward row transform unit 98, respectively. In some examples, the inverse column transform may be referred to as a first stage of an inverse transform, and the inverse row transform may be referred to as a second stage of the transform.

In operation, according to aspects of this disclosure, video encoder 92 may store an entire block of pixel values to prefetch buffer 94. Video encoder 92 may feed the difference between the pixel values and predicted pixel values (residual values) to forward row transform unit 98.

Forward row transform unit 98 may apply a horizontally oriented transform to the received residual values. According to aspects of this disclosure, forward row transform unit 98 may apply the horizontally oriented transform to residual values in column order. Accordingly, as described in greater detail with respect to FIG. 5 below, forward row transform unit 98 provides first stage results (partially transformed residual values) to forward column transform unit 102 in the order required for proper transformation by forward column transform unit 102. In this way, video encoder 92 does not need to buffer and transpose first stage results between forward row transform unit 98 and forward column transform unit 102.

Forward column transform unit 102 may execute a forward column transform on received first stage results to generate transform coefficients from the residual values. According to aspects of this disclosure, forward column transform unit 102 may perform at least some operations concurrently with forward row transform unit. For example, forward column transform unit 102 may begin performing second stage operations upon receiving first stage results and prior to the completing first stage operations.

Quantization unit 106 quantizes transform coefficients from forward column transform unit 102 and stores the quantized transform coefficients to memory 110. In some instances, a coding module of video encoder 92 such as a fixed length or entropy coding module may retrieve the quantized transform coefficients from memory 110 to form an encoded bitstream.

Video encoder 92 may also retrieve quantized transform coefficients from memory to generate reference frames for predictive coding. Accordingly, inverse quantization unit 114 may also retrieve the quantized transform coefficients and perform inverse quantization to produce transform coefficients.

Inverse column transform unit 118 may receive transform coefficients from inverse quantization unit 114 and may execute an inverse column transform on the received values. According to aspects of this disclosure, inverse column transform unit 118 may provide first stage results (partially inverse transformed residual values) to inverse row transform unit 122 in the order required for proper transformation by inverse row transform unit 122. In this way, video encoder 92 does not need to buffer and transpose first stage results between inverse column transform unit 118 and inverse row transform unit 122.

Inverse row transform unit 122 may execute an inverse row transform on received first stage results to generate reconstructed residual values (which may be slightly different from the original residual values, due to lossy coding techniques) from the transform coefficients. According to aspects of this disclosure, inverse row transform unit 122 may perform at least some operations concurrently with inverse column transform unit 118. For example, inverse row transform unit 122 may begin performing second stage operations upon receiving first stage results and prior to the completing first stage operations.

While FIG. 4 is described with respect to a video encoder, it should be understood that the techniques described above may also be performed by a video decoder. That is, as noted above with respect to FIG. 3, a video decoder may perform the techniques in a generally reciprocal manner, and without reordering data between a first stage of an inverse transform and a second stage of an inverse transform.

Figure 5:
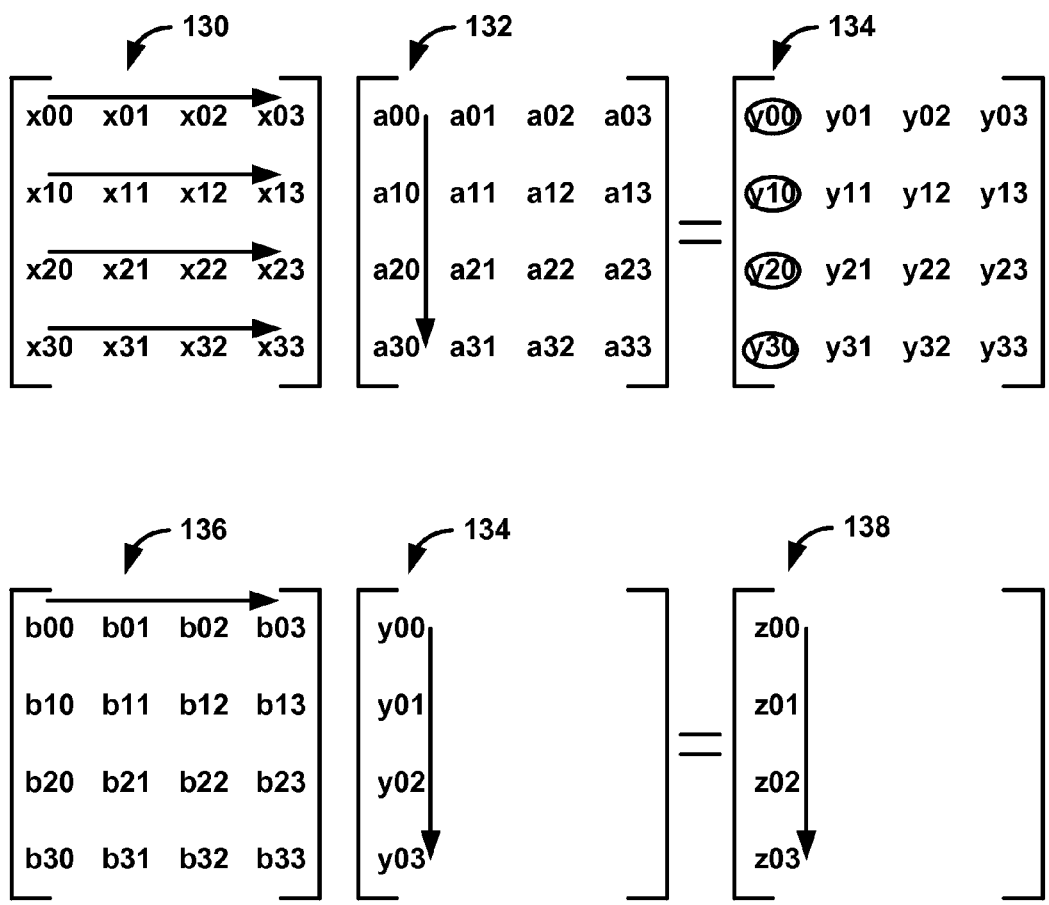
FIG. 5 illustrates a series of matrices operations according to techniques of this disclosure.

FIG. 5 is a series of matrices illustrating the techniques of this disclosure. The series of matrices shown in FIG. 5 generally illustrate the "transpose first" process described above. While described with respect to video encoder 92 (FIG. 4), it should be understood that the process described with respect to FIG. 5 may be carried out by a variety of other processors (including, for example, video encoder 20, video decoder 30, or other processors).

The example of FIG. 5 includes an array of residual values 130 (x00 to x33) to which a first stage of a transform 132 (a00 to a33) is applied to generate first stage results 134 (y00 to y33). The first stage of transform 132 may be configured as a forward row transform. In addition, FIG. 5 includes a second stage of a transform 136 (b00 to b33) that is applied to first stage results 134 to generate second stage results 138 (z00 to z03). The second stage of the transform 136 may be configured as a forward column transform.

As shown in FIG. 5, forward row transform unit 98 executes first stage 132 (a00 to a33) on residual values 130 (x00 to x33). Rather than executing first stage 132 to produce results 134 in row order (e.g., to produce y00, followed by y01, followed by y02, and so on), forward row transform unit 98 may apply each row of residual values 130 to first stage 132 in column order to generate results 134 in a column-by-column fashion. That is, forward row transform unit 98 applies the first column of first stage 132 (a00, a10, a20, and a30) to the first row of residual values 130 (x00, x01, x02, and x03) to generate first stage result y00 (e.g., y00=x00*a00+x01*a10+x02*a20+x03*a30). Likewise, forward row transform unit 98 applies the first column of first stage 132 (a00, a10, a20, and a30) to the second row of residual values 130 (x10, x11, x12, and x13) to generate the first stage result y10 (e.g., y01=x10*a00+x11*a10+x12*a20+x13*a30). Forward row transform unit 98 may continue in this manner until each first stage result 134 of the first column has been evaluated. Forward row transform unit 98 may then proceed to generate the second column of first stage results 134, and so on, until forward row transform unit 98 has evaluated all first stage results 134.

Forward column transform unit 102 applies a column oriented transform to columns of first stage results. Because forward row transform unit 98 generates first stage results 134 in column order, forward column transform unit 102 may begin executing second stage 136 immediately upon receiving first stage results 134 from forward row transform unit 98. That is, forward column transform unit 102 does not need to reorder first stage results 134 prior to executing second stage 136 on first stage results 134. In addition, forward column transform unit 102 may execute second stage 136 concurrently with forward row transform unit 98 executing first stage 132. That is, forward column transform unit 102 may begin executing second stage 136 prior to the time at which forward row transform unit 98 completes first stage 132.

As shown in FIG. 5, forward column transform unit 102 directly executes second stage 136 (b00-b33) on first stage results 134 (y00-y33) without reordering. For example, forward column transform unit 102 executes the first row of second stage 136 (b00, b01, b02, and b03) on the first column first stage results 134 (y00, y10, y20, and y30) to generate the second stage result z00 (e.g., z00=b00*y00+b01*y10+b02*y20+b03*y30). Likewise, forward column transform unit 102 executes the second row of second stage 136 (b10, b11, b12, and b13) on the first column of first stage results (y00, y10, y20, and y30) to generate the second stage result z10 (e.g., z01=b10*y00+b11*y10+b12*y20+b13*y30). Forward column transform unit 102 may continue in this manner until each second stage result 138 of the first column has been determined. Forward column transform unit 138 may then proceed to generate the second column of second stage results 138, and so on, until forward column transform unit 102 has determined all second stage results 138.

By initially prefetching and filling prefetch buffer 94 with residual values 130 and executing first stage 132 in the order required for second stage 136, video encoder 92 may reduce delays associated with buffering and/or reordering values between the first and second stages.

It should be understood that the techniques described with respect to FIG. 5 are provided as merely one example. While described with respect to forward row transform unit 98 and forward column transform unit 102, the techniques may also be performed in inverse by inverse column transform unit 118 and inverse row transform unit 122 of FIG. 4. In other examples, the techniques may be carried out by a variety of other processing components. In addition, as noted above with respect to FIG. 4, while described with respect to a video encoder, it should be understood that the techniques described above may also be performed by a video decoder.

Figure 6:
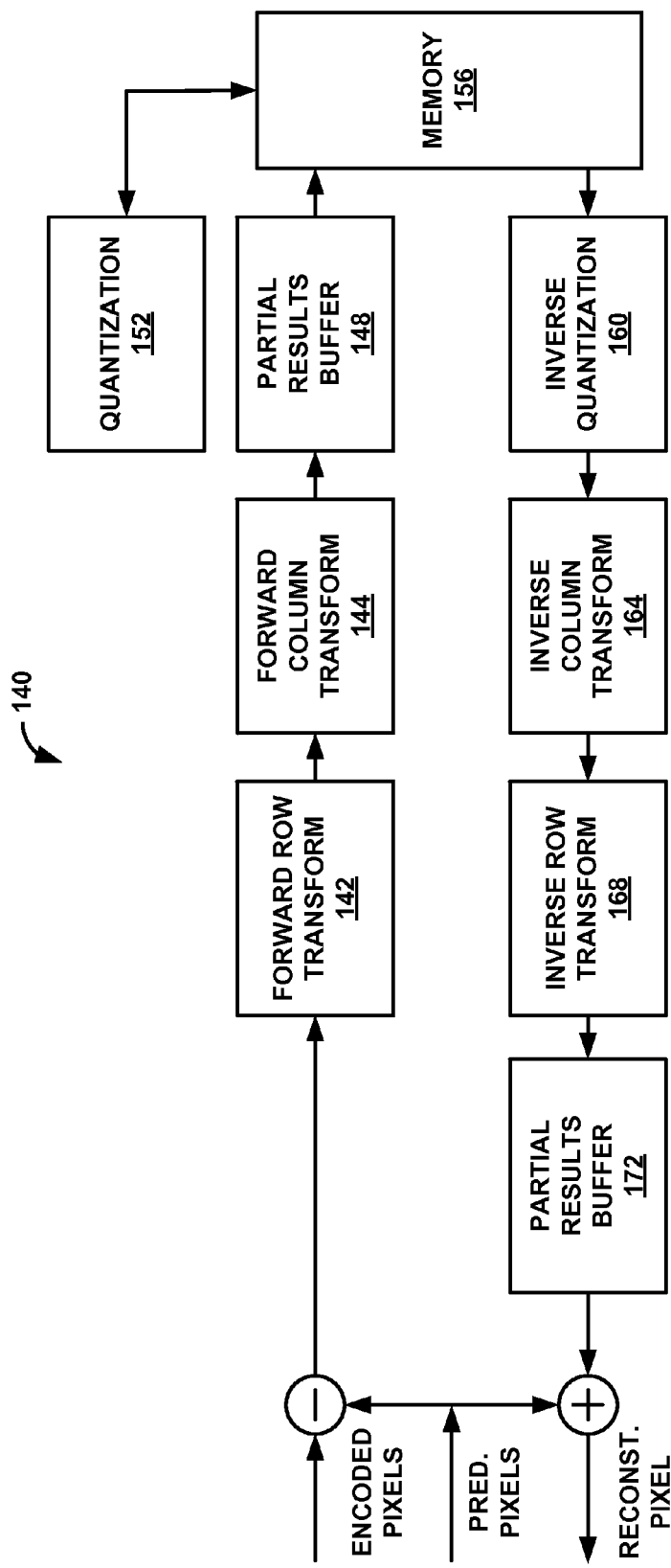
FIG. 6 is a block diagram illustrating a portion of an example video coder that may implement the techniques of this disclosure.

FIG. 6 is a block diagram illustrating a portion of an example video encoder 140 that may implement the techniques of this disclosure. In some examples, the portion of the video encoder 140 shown and described with respect to FIG. 6 may form a portion of video encoder 20 (FIGS. 1 and 2) and/or video decoder 30 (FIGS. 1 and 3) described above.

In any case, the example video encoder 92 of FIG. 4 may carry out the techniques of this disclosure referred to as the "transpose later" process described above. The portion of the video encoder 140 shown in FIG. 6 generally includes a forward row transform unit 142, a forward column transform unit 144, a partial results buffer 148, a quantization unit 152, a memory 156, an inverse quantization unit 160, an inverse column transform unit 164, an inverse row transform unit 168, and a partial results buffer 172. It should be understood that one or more units of the video encoder 140 shown in FIG. 6 may be highly integrated, but are illustrated separately for conceptual purposes.

In some examples, forward row transform unit 142 and forward column transform unit 144 may be configured similarly to or the same as transform processing unit 52 shown in video encoder 20 of FIG. 2. Forward row transform unit 142 and forward column transform unit 144 may apply a forward row transform and a forward column transform of a 2-D transform, respectively, to a block of residual data. The forward row transform may be referred to as a first stage of a transform, and the forward column transform may be referred to as a second stage of the transform. The arrangement of forward row transform unit 142 and forward column transform unit 144 shown in FIG. 6 is for purposes of example only, and in other examples forward row transform unit 142 and forward column transform unit 144 may be transposed or a transform with a different orientation may be used.

Partial results buffer 148 may be memory associated with a transform engine that includes components of video encoder 140. In other examples, partial results buffer 148 may be allocated in a memory of the video encoder 140 that is shared by a variety of components of video encoder 140. In any case, as described in greater detail below, partial results buffer 148 may be sized to store transform coefficients for blocks of various sizes. For example, partial results buffer 148 may store results from forward column transform unit 144, which may be aggregated to produce transform coefficients for a block of video data. In some examples, partial results buffer 148 may be a circular first-in-first-out (FIFO) buffer.

Quantization unit 152 may quantize transform coefficients from forward row transform unit 142 and forward column transform unit 144. In some instances, quantization unit 152 may be configured similarly to or the same as quantization unit 54 shown in FIG. 2. Memory 156 may store quantized transform coefficients, and may be shared with one or more other components of the video encoder 140.

Inverse quantization unit 160 may perform inverse quantization in a reciprocal manner to quantization unit 152. Likewise, inverse column transform unit 164 and inverse row transform unit 168 may apply transformation in a reciprocal manner to forward column transform unit 144 and forward row transform unit 142, respectively. In some examples, the inverse column transform may be referred to as a first stage of an inverse transform, and the inverse row transform may be referred to as a second stage of the transform.

Although shown separately from partial results buffer 148, in some examples, partial results buffer 172 may be integrated with partial results buffer 148. As described in greater detail below, partial results buffer 172 may be sized to store residual data for blocks of various sizes. For example, partial results buffer 172 may store results from inverse row transform unit 168, which may be aggregated to produce residual values for a block of video data.

In operation, according to aspects of this disclosure, video encoder 140 may feed the difference between the pixel values and predicted pixel values (residual values) to forward row transform unit 142. Forward row transform unit 142 may apply a horizontally oriented transform to the received residual values. For example, forward row transform unit 142 may apply the horizontally oriented transform to residual values in row order. Forward row transform unit 142 provides first stage results (partially transformed residual values) to forward column transform unit 144 in row order.

Forward column transform unit 144 may execute a forward column transform on received first stage results to generate transform coefficients from the residual values. Forward column transform unit 144 may perform at least some operations concurrently with forward row transform unit. For example, forward column transform unit 144 may begin performing second stage operations upon receiving first stage results from forward row transform unit 142 and prior to completion of first stage operations, i.e., before all first stage results have been generated.

According to aspects of this disclosure, forward column transform unit 144 may generate a plurality of partial transform results and store the partial transform results to partial results buffer 148. For example, as described in greater detail with respect to FIG. 7 below, forward column transform unit 144 may apply a column oriented transform to first stage results in row order. Accordingly, forward column transform unit 144 may generate a partial second stage result for each first stage result.

By generating partial second stage results and storing the partial results to partial results buffer 148, forward column transform unit 144 may apply a forward column transform to first stage results without reordering the results. Accordingly, video encoder 140 does not need to buffer and transpose first stage results prior to applying the second stage. Rather, video encoder 140 aggregates partial second stage results stored to partial results buffer 148 to generate transform coefficients, which video encoder 140 may then store to memory 156. In some examples, as noted above, partial results buffer 148 may form a circular FIFO buffer. In such examples, each partial result can be aggregated with the corresponding other partial results (associated with the same position in a results matrix) as the partial results are generated. Accordingly, video encoder 140 can aggregate results as each row of first row results are processed at the second stage.

According to aspects of this disclosure, forward column transform unit 144 may perform at least some operations concurrently with forward row transform unit 142. For example, forward column transform unit 144 may begin performing second stage operations upon receiving first stage results and prior to the completing first stage operations (at forward row transform unit 142), i.e., before all first stage results have been generated.

Quantization unit 152 quantizes transform coefficients (after aggregation) and stores the quantized transform coefficients to memory 156. In some instances, a coding module of video encoder 140 such as a fixed length or entropy coding module may retrieve the quantized transform coefficients from memory 156 to form an encoded bitstream.

Video encoder 140 may also retrieve quantized transform coefficients from memory to generate reference frames for predictive coding. Accordingly, inverse quantization unit 160 may also retrieve the quantized transform coefficients and perform inverse quantization to produce transform coefficients.

Inverse column transform unit 164 may receive transform coefficients from inverse quantization unit 160 and may execute an inverse column transform on the received values. Inverse column transform unit 164 may provide first stage results (partially inverse transformed residual values) to inverse row transform unit 168. Inverse row transform unit 168 may execute an inverse row transform on received first stage results to generate residual values from the transform coefficients.

According to aspects of this disclosure, inverse row transform unit 168 may generate a plurality of partial transform results and store the partial transform results to partial results buffer 172. For example, inverse row transform unit 168 may apply a row oriented transform to first stage results in column order. Accordingly, inverse row transform unit 168 may generate a partial second stage result for each first stage result.

By generating partial second stage results and storing the partial results to partial results buffer 172, inverse row transform unit 168 may apply an inverse row transform to first stage results without reordering the results. Accordingly, video encoder 140 does not need to buffer and transpose first stage results prior to applying the second stage. Rather, video encoder 140 aggregates partial second stage results stored to partial results buffer 172 to generate residual values, which video encoder 140 may then use to determine reference pictures. According to aspects of this disclosure, inverse row transform unit 168 may perform at least some operations concurrently with inverse column transform unit 164. For example, inverse row transform unit 168 may begin performing second stage operations upon receiving first stage results and prior to the completing first stage operations (at inverse column transform unit 164).

While FIG. 6 is described with respect to a video encoder, it should be understood that the techniques described above may also be performed by a video decoder. That is, as noted above with respect to FIG. 3, a video decoder may perform the techniques in a generally reciprocal manner, and without reordering data between a first stage of an inverse transform and a second stage of an inverse transform.

Figure 7:
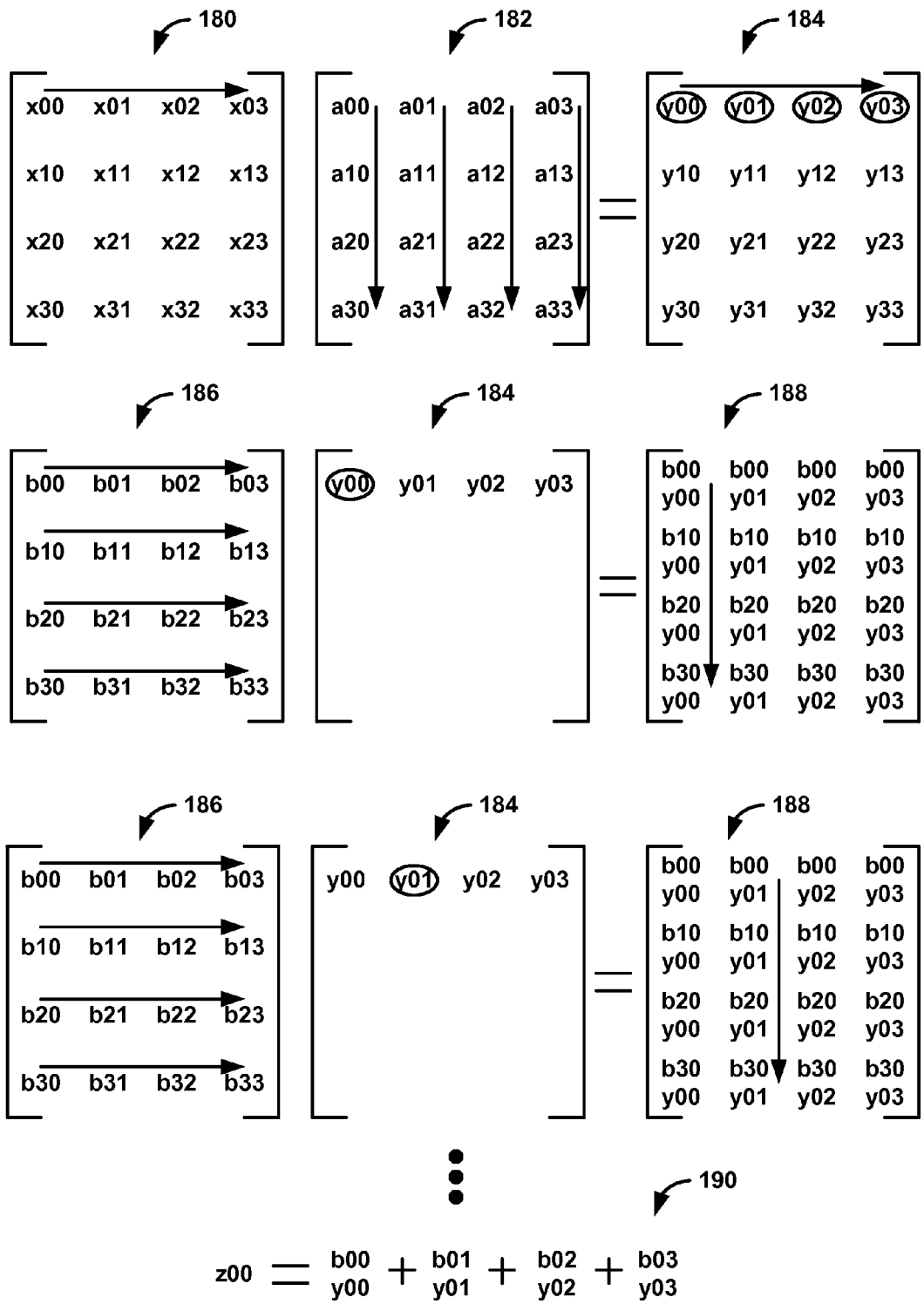
FIG. 7 illustrates a series of matrices operations according to techniques of this disclosure.

FIG. 7 is a series of matrices illustrating the techniques of this disclosure. The series of matrices shown in FIG. 7 generally illustrate the "transpose later" process described above. While described with respect to video encoder 140 (FIG. 6), it should be understood that the process described with respect to FIG. 7 may be carried out by a variety of other processors (including, for example, video encoder 20, video encoder 92, video encoder 140, video decoder 30, or other processors).

The example of FIG. 7 includes an array of residual values 180 (x00 to x33) to which a first stage of a transform 182 (a00 to a33) is applied to generate first stage results 184 (y00 to y33). In addition, FIG. 7 includes a second stage of a transform 186 (b00 to b33) that is applied to first stage results 184 to generate partial second stage results 188, which may be aggregated to form second stage results 190 (z00 to z03).

As shown in FIG. 7, forward row transform unit 142 executes first stage 182 (a00 to a33) on residual values 180 (x00 to x33), which results in first stage results 184 (y00 to y33). In contrast to the example shown and described with respect to FIGS. 4 and 5 ("transpose first"), forward row transform unit 142 executes first stage 182 on the first row of residual values to generate first stage results 184 in row order (as indicated by circles around first stage results 184 y00, y01, y02, and y03). For example, forward row transform unit 142 applies the first column of the first stage (a00, a10, a20, and a30) to the first row of residual values 180 (x00, x01, x02, and x03) to generate the first stage result y00 (e.g., y00=x00*a00+x01*a10+x02*a20+x03*a30). Likewise, forward row transform unit 142 applies the second column of first stage 182 (a01, a11, a21, and a31) to the first row of residual values 180 (x00, x01, x02, and x03) to generate the first stage result y01 (e.g., y01=x00*a01+ x01*a11+x02*a21+x03*a31). Forward row transform unit 142 may continue in this manner until each first stage result 184 of the first row has been evaluated. Forward row transform unit 142 may then proceed to generate the second row of first stage results 184, and so on, until forward row transform unit 142 has evaluated all first stage results 184.

In addition, rather than waiting for the entire column of first stage results to become available (e.g., y00, y10, y20, y30, as would typically be required for a column oriented second stage), forward column transform unit 144 may generate partial second stage results in row order. For example, as soon as forward row transform unit 142 has evaluated the initial first stage result 184 of the first column (y00), forward column transform unit 144 may apply second stage 186 (b00-b33) to the initial first stage result (y00). In this example, forward column transform unit 144 may generate the partial results 188 shown in the first column (b00*y00, b10*y00, b20*y00, and b30*y00) (as indicated by the downward arrow).

As noted above, forward row transform unit 142 proceeds in row order. Accordingly, when the second first stage result 184 (y01) becomes available, forward column transform unit may generate partial results 188 shown in the second column (b00*y01, b10*y01, b20*y01, and b30*y01) (as indicated by the downward arrow). As forward row transform unit 142 generates additional first stage results 184, forward column transform unit 144 may generate corresponding additional partial results 188. Accordingly, forward row transform unit 142 and forward column transform unit 144 may operate concurrently, and video encoder 140 does not reorder first stage results 184 between the first and second transform stages.

Video encoder 140 may store each of the partial results to partial results buffer 148. Video encoder 140 may aggregate the partial results upon forward column transform unit 144 completing the second stage. For example, as shown in the example of FIG. 7, video encoder 140 may generate second stage result 190 (z00) by aggregating b00*y00 (partial result from y00), b01*y01 (partial result from y01), b02*y01 (partial result from y02), and b03*y03 (partial result from y03). Video encoder 140 may generate the remaining second stage results 190 in a similar manner.

In some examples, video encoder 140 may aggregate second stage results as the partial results become available. In other examples, video encoder 140 may generate all partial second stage results prior to aggregating the second stage results.

It should be understood that the techniques described with respect to FIG. 7 are provided as merely one example. While described with respect to forward row transform unit 142, forward column transform unit 144, and partial results buffer 148, the techniques may also be performed in inverse by inverse column transform unit 164, inverse row transform unit 168, and partial results buffer 172 of FIG. 6. In other examples, the techniques may be carried out by a variety of other processing components.

Figure 8:
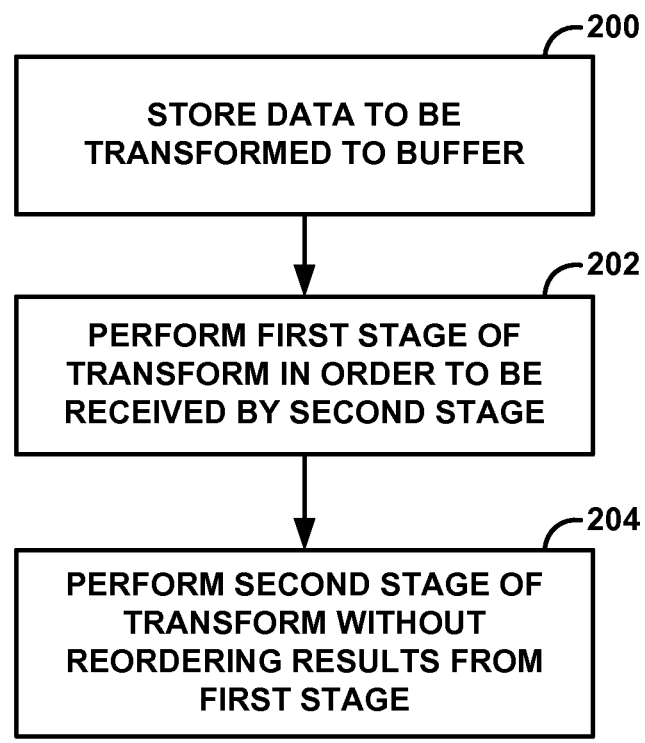
FIG. 8 is a flow diagram illustrating an example process for transforming residual data in video coding, according to the techniques of this disclosure.

FIG. 8 is a flow diagram illustrating an example process for transforming video data (e.g., transforming residual data when performing forward transformation, or transforming transform coefficients when performing inverse transformation) in video coding, according to the techniques of this disclosure. The example shown in FIG. 8 is generally described as being performed by a video coder. It should be understood that, in some examples, the process of FIG. 8 may be carried out by video encoder 20, video decoder 30, or a variety of other processors, processing units, hardware-based coding units such as encoder/decoders (CODECs), and the like.

In the example of FIG. 8, a video coder (e.g., such as video encoder 20 or video decoder 30) may store data to be transformed to a buffer (200). For example, when performing forward transformation, the video coder may prefetch and store a block of residual video data to a buffer. Prior to performing inverse transformation, the video coder may store a block of transform coefficients to a buffer.

The video coder may then perform a first stage of a 2D transform in an order in which the data is to be operated on by the second stage (202). For example, assume for purposes of illustration that the video coder executes a 2D transform having a row oriented first stage and a column oriented second stage. In this example, the video coder may perform the first stage transformation in column order, so that the second stage may directly receive results from the first stage without reordering. In another example for purposes of illustration, assume the video coder executes a 2D transform having a column oriented first stage and a row oriented second stage. In this example, the video coder may perform the first stage in row order, so that the second stage may directly receive the results of the first stage without reordering. Other examples with transforms having a variety of other different orientations are also possible.

In any case, the video coder may perform the second stage of the transform without reordering the results from the first stage (204). For example, because the video coder performs the first stage in an order dictated by the second stage, the video coder need not reorder the first stage results prior to executing the second stage. Accordingly, the video coder may efficiently transform values without the delay associated with such reordering. Moreover, the video coder may concurrently execute at least a portion of the first and second stages, as described above.

Figure 9:
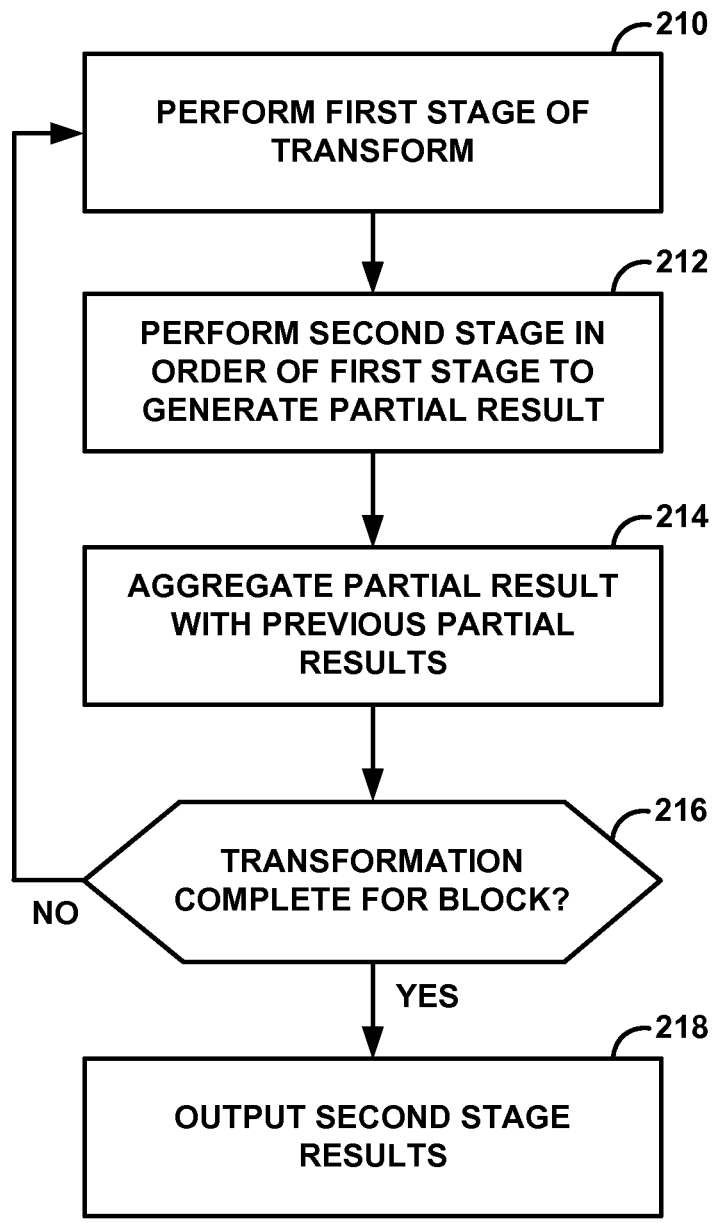
FIG. 9 is a flow diagram illustrating another example process for transforming residual data in video coding, according to the techniques of this disclosure.

FIG. 9 is a flow diagram illustrating an example process for transforming residual data in video coding, according to the techniques of this disclosure. The example shown in FIG. 9 is generally described as being performed by a video coder. It should be understood that, in some examples, the process of FIG. 9 may be carried out by video encoder 20, video decoder 30, or a variety of other processors, processing units, hardware-based coding units such as encoder/decoders (CODECs), and the like.

In the example of FIG. 9, a video coder (e.g., such as video encoder 20 or video decoder 30) may perform a first stage of a 2D transform (210). For example, the video coder may apply a first stage of a forward transform to generate partially transform residual values. In another example, the video coder may apply a first stage of an inverse transform to generate partially inverse transformed transform coefficients.

The video coder may also perform a second stage of the transform in the order of the first stage to generate partial second stage results (212). For example, assume for purposes of illustration that the video coder executes a 2D transform having a row oriented first stage and a column oriented second stage on a block of residual video data. In this example, the video coder may execute the second stage of the transform on the results of the first stage as the results of the first stage become available in row order. Thus, for a 16×16 block of residual values (as merely one example), the video coder may generate 16 partial results for an initial first stage result. The video coder may also generate 16 partial results for the subsequent first stage result in row order (located in the same row as the initial first stage result), and so on, until the video coder has generated partial results corresponding to each first stage result of the first row of first stage results. The video coder may then move to the next row of first stage results (as the next row of first stage results becomes available), and so on, until it has generated partial second stage results for the entire block.

Accordingly, as shown in the example of FIG. 9, the video coder may aggregate the partial result with any previously generated partial results for a particular location (e.g., transform coefficient or residual value location in the block) (214). The video coder may then determine whether transformation is complete for the block being coded (216). If the partial result that was generated is associated with the final location of the block (transformation is complete, the "yes" branch of step 216), the video coder may output the aggregated second stage results (218). If transformation is not complete (the "no" branch of step 216), the video coder may return to step 210 and generate the next first stage result.

Certain aspects of this disclosure have been described with respect to the developing HEVC standard for purposes of illustration. However, the techniques described in this disclosure may be useful for other video coding processes, such as those defined according to H.264 or other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of transforming video data in video coding, the method comprising:
    determining, by a video coding device, a first stage of a two-dimensional transform for transforming a block of video data values, wherein the first stage has a horizontal orientation or a vertical orientation;
    determining, by the video coding device, a second stage of the two-dimensional transform, wherein the second stage has a vertical orientation when the first stage has a horizontal orientation, and wherein the second stage has a horizontal orientation when the first stage has a vertical orientation;
    applying, by the video coding device, the first stage of the two-dimensional transform to the block of video data values to generate first stage results;
    transferring, by the video coding device, the first stage results directly to the second stage without buffering and reordering the first stage results between the first stage and the second stage; and
    applying, by the video coding device, the second stage of the two-dimensional transform to the transferred first stage results to generate a block of second stage results.

2. The method of claim 1, further comprising:
   storing all video data values of the block to a buffer prior to applying the first stage; and
   wherein applying the first stage comprises applying the first stage based on the orientation of the second stage, and
   wherein transferring the first stage results comprises transferring the first stage results directly to the second stage in the orientation of the second stage.

3. The method of claim 1,
   wherein applying the first stage comprises applying the first stage based on the orientation of the first stage to generate the first stage results,
   wherein transferring the first stage results comprises transferring the first stage results directly to the second stage in the orientation of the first stage,
   wherein applying the second stage comprises applying the second stage to the first stage results based on the orientation of the second stage to generate a plurality of partial second stage results, and aggregating the plurality of partial second stage results to generate the block of second stage results.

4. The method of claim 3, further comprising storing the plurality of partial second stage results to a circular first-in-first-out partial results buffer.

5. The method of claim 1, wherein the two-dimensional transform comprises a forward transform such that the block of second stage results comprises a block of transform coefficients.

6. The method of claim 1, wherein the two-dimensional transform comprises an inverse transform such that the block of second stage results comprises a block of reconstructed residual values.

7. An apparatus for transforming video data in video coding, the apparatus comprising:
   a memory configured to store a block of video data values; and
   one or more processors configured to:
   determine a first stage of a two-dimensional transform for transforming the block of video data values, wherein the first stage has a horizontal orientation or a vertical orientation;
   determine a second stage of the two-dimensional transform, wherein the second stage has a vertical orientation when the first stage has a horizontal orientation, and wherein the second stage has a horizontal orientation when the first stage has a vertical orientation;
   apply the first stage of the two-dimensional transform to the block of video data values to generate first stage results;
   transfer the first stage results directly to the second stage without buffering and reordering the first stage results between the first stage and the second stage; and
   apply the second stage of the two-dimensional transform to the transferred first stage results to generate a block of second stage results.

8. The apparatus of claim 7, wherein the one or more processors are further configured to:
   store all video data values of the block to a buffer prior to applying the first stage; and
   wherein to apply the first stage, the one or more processors are configured to apply the first stage based on the orientation of the second stage, and
   wherein to transfer the first stage results, the one or more processors are configured to transfer the first stage results directly to the second stage in the orientation of the second stage.

9. The apparatus of claim 7,
   wherein to apply the first stage, the one or more processors are configured to apply the first stage based on the orientation of the first stage to generate the first stage results,
   wherein to transfer the first stage results, the one or more processors are configured to transfer the first stage results directly to the second stage in the orientation of the first stage,
   wherein to apply the second stage, the one or more processors are configured to apply the second stage to the first stage results based on the orientation of the second stage to generate a plurality of partial second stage results, and to aggregate the plurality of partial second stage results to generate the block of second stage results.

10. The apparatus of claim 9, wherein the one or more processors are further configured to store the plurality of partial second stage results to a circular first-in-first-out partial results buffer.

11. The apparatus of claim 7, wherein the two-dimensional transform comprises a forward transform such that the block of second stage results comprises a block of transform coefficients.

12. The apparatus of claim 7, wherein the two-dimensional transform comprises an inverse transform such that the block of second stage results comprises a block of reconstructed residual values.

13. An apparatus for transforming video data in video coding, the apparatus comprising:
   means for determining a first stage of a two-dimensional transform for transforming a block of video data values, wherein the first stage has a horizontal orientation or a vertical orientation;
   means for determining a second stage of the two-dimensional transform, wherein the second stage has a vertical orientation when the first stage has a horizontal orientation, and wherein the second stage has a horizontal orientation when the first stage has a vertical orientation;
   means for applying the first stage of the two-dimensional transform to the block of video data values to generate first stage results;
   means for transferring the first stage results directly to the second stage without buffering and reordering the first stage results between the first stage and the second stage; and
   means for applying the second stage of the two-dimensional transform to the transferred first stage results to generate a block of second stage results.

14. The apparatus of claim 13, further comprising:
   means for storing all video data values of the block to a buffer prior to applying the first stage; and
   wherein the means for applying the first stage comprises means for applying the first stage based on the orientation of the second stage, and
   wherein the means for transferring the first stage results comprises means for transferring the first stage results directly to the second stage in the orientation of the second stage.

15. The apparatus of claim 13,
   wherein the means for applying the first stage comprises means for applying the first stage based on the orientation of the first stage to generate the first stage results, wherein the means for transferring the first stage results comprises means for transferring the first stage results directly to the second stage in the orientation of the first stage, wherein the means for applying the second stage comprises means for applying the second stage to the first stage results based on the orientation of the second stage to generate a plurality of partial second stage results, and means for aggregating the plurality of partial second stage results to generate the block of second stage results.

16. The apparatus of claim 15, further comprising means for storing the plurality of partial second stage results to a circular first-in-first-out partial results buffer.

17. The apparatus of claim 13, wherein the two-dimensional transform comprises a forward transform such that the block of second stage results comprises a block of transform coefficients.

18. The apparatus of claim 13, wherein the two-dimensional transform comprises an inverse transform such that the block of second stage results comprises a block of reconstructed residual values.

19. A non-transitory computer-readable medium having instructions stored thereon that, when executed, cause one or more processors to:
determining a first stage of a two-dimensional transform for transforming a block of video data values, wherein the first stage has a horizontal orientation or a vertical orientation;
determining a second stage of the two-dimensional transform, wherein the second stage has a vertical orientation when the first stage has a horizontal orientation, and wherein the second stage has a horizontal orientation when the first stage has a vertical orientation;
apply the first stage of the two-dimensional transform to the block of video data values to generate first stage results;
transfer the first stage results directly to the second stage without buffering and reordering the first stage results between the first stage and the second stage; and
apply the second stage of the two-dimensional transform to the transferred first stage results to generate a block of second stage results.

20. The non-transitory computer-readable medium of claim 19, wherein the instructions further cause the one or more processors to:
store all video data values of the block to a buffer prior to applying the first stage; and
wherein to apply the first stage, the instructions cause the one or more processors to apply the first stage based on the orientation of the second stage, and
wherein to transfer the first stage results, the instructions cause the one or more processors to transfer the first stage results directly to the second stage in the orientation of the second stage.

21. The non-transitory computer-readable medium of claim 19,
wherein to apply the first stage, the instructions cause the one or more processors to apply the first stage based on the orientation of the first stage to generate the first stage results,
wherein to transfer the first stage results, the instructions cause the one or more processors to transfer the first stage results directly to the second stage in the orientation of the first stage,
wherein to apply the second stage, the instructions cause the one or more processors to apply the second stage to the first stage results based on the orientation of the second stage to generate a plurality of partial second stage results, and to aggregate the plurality of partial second stage results to generate the block of second stage results.

22. The non-transitory computer-readable medium of claim 21, wherein the instructions further cause the one or more processors to store the plurality of partial second stage results to a circular first-in-first-out partial results buffer.

23. The non-transitory computer-readable medium of claim 19, wherein the two-dimensional transform comprises a forward transform such that the block of second stage results comprises a block of transform coefficients.

24. The non-transitory computer-readable medium of claim 19, wherein the two-dimensional transform comprises an inverse transform such that the block of second stage results comprises a block of reconstructed residual values.

* * * * *